United States Patent Office 3,308,173
Patented Mar. 7, 1967

3,308,173
PREPARATION OF PRIMARY ALCOHOLS FROM GLYCOLS BY TELOMERIZING α-OLEFIN WITH GLYCOL BORATE, HYDROLYSING TO OBTAIN TELOMER GLYCOL, DEHYDRATING THE GLYCOL TO OBTAIN ALKENOL AND THEN HYDROGENATING
Donald D. Emrick, Shaker Heights, Ohio, assignor to The Standard Oil Company, Cleveland, Ohio, a corporation of Ohio
No Drawing. Filed Aug. 30, 1961, Ser. No. 134,834
7 Claims. (Cl. 260—642)

This invention relates to a process for the production of high molecular weight saturated primary alcohols from low molecular weight α and β alkylene glycols by way of the telomerization of the corresponding alkylene glycol borates, hydrolyzing the borate telomers to telomer alkylene glycols, dehydrating the high molecular weight alkylene glycols, and hydrogenating the alkenols thereby produced to saturated primary alcohols.

U.S. Patents Nos. 2,668,181, 2,504,400, and 2,683,141, describe the telomerization of monohydric aliphatic alcohols. However, these alcohols telomerize quite inefficiently, so that the telomerization cannot be carried out at an economical cost, as is a prerequisite of a commercial process. Furthermore, the primary alcohols other than methanol yield secondary alcohols, and secondary alcohols yield tertiary alcohols, since the telomerization substitutes a polyolefin group on the carbon bearing the hydroxyl group. It is impractical to prepare a primary alcohol by this method. Methanol reacts as a telogen with very poor initiator efficiency and with rather low chain terminating ability. Ethanol is only slightly better and gives a secondary alcohol. Isopropanol, which has an active tertiary hydrogen on the carbon bearing the hydroxyl group, has a more satisfactory chain terminating ability, but the product is a tertiary alcohol, and the tertiary hydroxyl linkage is not sufficiently stable against dehydration to permit the preparation of esters for use as plasticizers and detergents.

Long-chain saturated primary alcohols can be prepared in accordance with the Prins reaction and olefin aldehyde condensation, described by Arundale, Chemical Reviews 51, 505–55 (1952). This is run so as to produce saturated metadioxanes, which upon acid hydrolysis produce glycols or unsaturated primary alcohols. U.S. Patents Nos. 2,421,862 and 2,449,001, British No. 544,737 and Canadian No. 434,624 describe the production of glycols using the Prins reaction. The difficulty with this process, from the commercial standpoint, is the unavailability of large quantities of inexpensive long-chain alkenes of the proper structure. The long-chain olefins of the type required for the Prins reaction are expensive, and difficult to isolate from petroleum refinery streams, the principal source of raw material. Moreover, the Prins reaction is subject to many side reactions which tend to reduce the yield.

In accordance with the instant invention, long-chain primary saturated aliphatic alcohols are prepared, starting with an α or β alkylene glycol borate having one primary oxygenated group —CH$_2$—O—B< and a secondary or tertiary oxygenated group —CHR—O—B< or —CRR—O—B<. This borate is employed as the telogen in the presence of a free radical initiator for telomerization, telomerizing it with an unsaturated hydrocarbon taxogen, thus producing a telomer containing boron in the molecule in the form of an alkylene glycol borate end group. This borate group is hydrolyzed, regenerating the glycol, to which a polyolefin group is now attached. The secondary or tertiary hydroxyl group of the glycol at the branched chain telomeric group is removed by dehydration, forming an unsaturated primary alcohol, or alkenol, and this is hydrogenated to a saturated alcohol. The resulting end product is a long-chain saturated primary alcohol.

The sequence of chemical reactions involved in this process can accordingly be outlined as follows; the $n_1$, $m_1$, and R designations are as defined hereinafter.

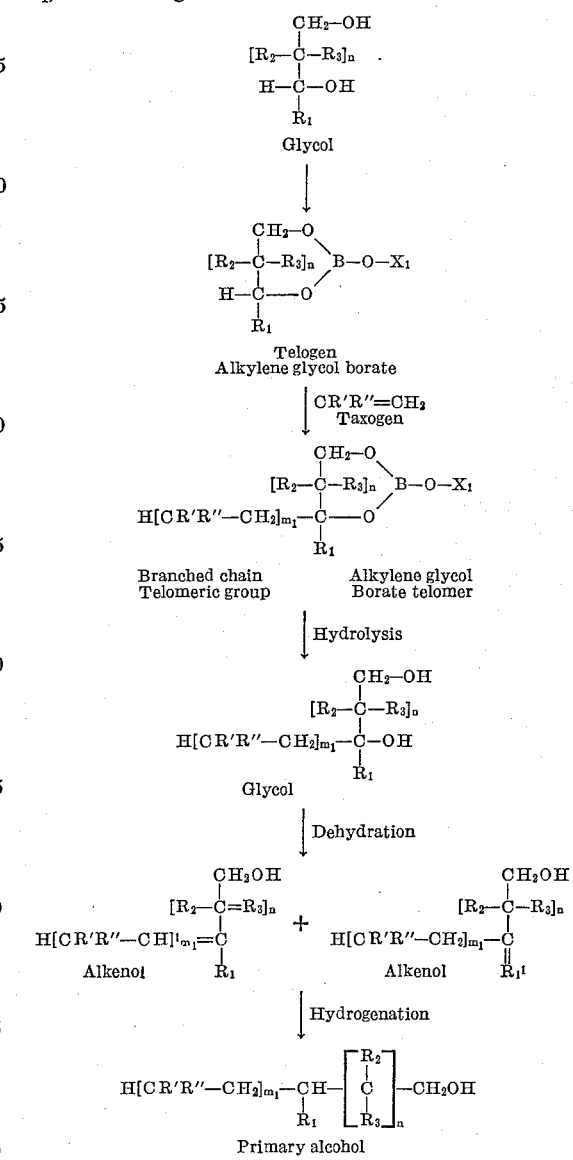

Primary alcohol

[1] $R_1$ and the polyolefin radical in this intermediate stage are unsaturated as shown.

The process of the invention is applicable to any alkylene having a terminal primary alcohol group and a hydrogen atom, preferably tertiary, on the carbon atom attached to the other hydroxyl group of the glycol.

These alkylene glycols can be defined by the following formula:

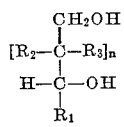

wherein $n$ is zero or one and $R_1$, $R_2$, and $R_3$ may be the same or different, and represent hydrogen atoms or alkyl, aryl, mixed aryl alkyl, mixed alkyl aryl, or cycloalkyl groups, each having from one to about ten carbon atoms, and preferably not having more than eight carbon atoms, and being of a size and number such that the total number of carbon atoms in the alkylene glycol is from about three and preferably from about four up to about thirty.

It will be observed that the above excludes ethylene glycol. Ethylene glycol can be employed, but it is more difficult to use than higher glycols because it has a tendency to form linear alkylene glycol borate polymers when reacted to form the corresponding alkylene glycol borates. Propylene glycol has a similar tendency, but does not form the linear polymers as readily as does ethylene glycol, and it is possible to obtain simple propylene glycol borates by careful reaction. This difficulty is not encountered with alkylene glycols having from four to thirty carbon atoms.

Typical $R_1$, $R_2$, and $R_3$ radicals are methyl, ethyl, n-propyl, isopropyl, n-butyl, isobutyl, secondary butyl, tertiary butyl, n-amyl, isoamyl, tertiary amyl, n-hexyl, isohexyl, 2-ethylhexyl, n-heptyl, tert-heptyl, n-octyl, iso-octyl, tert-octyl, n-nonyl, tert-nonyl, n-decyl, tert-decyl, phenyl, xylyl, benzyl, β-phenylethyl, α-phenylethyl, tolyl, ethylphenyl, dimethylphenyl, cyclohexyl, methylcyclohexyl, cyclopentyl and cycloheptyl.

The following alkylene glycols are typical of the general class to which the process of the invention is applicable: propanediol-1,2; propanediol-1,3; butanediol-1,3; 2-methylpentanediol-1,3; pentanediol-1,3; hexanediol-1,2; hexanediol-1,3; 2-ethylhexanediol-1,3; 3,4-dimethylhexanediol-1,2; octanediol-1,2; 3-phenylpropanediol-1,3; 2,3-dimethylbutanediol-1,2; 2,4,4-trimethylpentanediol-1,2; decanediol-1,2; 2-ethyl-2-butylpropanediol-1,3; 2,2-diethylpropanediol-1,3; and octadecylene glycol-1,2.

All of the glycols produced by this process have one easily dehydratable, i.e. secondary or, preferably, tertiary, hydroxyl group α or β to the terminal carbon atom of the chain, and one stable primary hydroxyl group attached to the terminal carbon atom of the chain. These products are therefore easily converted to an olefinic primary alcohol by partial dehydration removing the secondary or tertiary hydroxyl group. The process conditions are controlled so that the primary hydroxyl group is not removed while the sensitive secondary or tertiary hydroxyl group is removed, leaving an unsaturated double bond at that carbon atom.

In general, the dehydration can be effected by heating under controlled conditions below temperatures at which dehydration of the primary hydroxyl group would be obtained. The temperatures also must be kept low enough so that isomerization does not take place. In most cases, temperatures above about 150° C. and up to about 300° C. are satisfactory.

The corresponding alkylene glycol borates are readily prepared in accordance with known procedures, such as are described, for example, in U.S. Patent No. 2,741,548 to Darling, Fay and Szabo, patented April 10, 1956. Orthoboric acid is reacted with the glycol at a mildly elevated temperature. The water of reaction or at least a part of it is preferably removed, but a part or all of the water of reaction may remain in the reaction mixture, if desired. When the water is removed, it is preferably separated overhead, such as by blowing with nitrogen or by distillation. All of the water can be removed by simple boiling.

The structure of the alkylene glycol borate obtained depends upon the mole ratio of glycol to boric acid. This ratio can be 1:1, 2:2 or 3:2, and if a monovalent alcohol is incorporated, 1:1:1.

The formula of the alkylene glycol borate can be expressed in the following form:

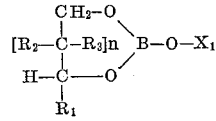

where $X_1$ is H, or $R_4$ or

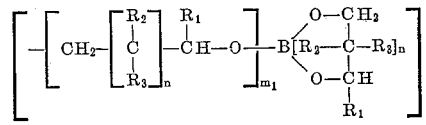

where $n$ is 0 or 1, and $m_1$ is 0 or 1.

The following specific groups of borates are within the class which can be used in accordance with the invention:

α-Alkylene glycol borates

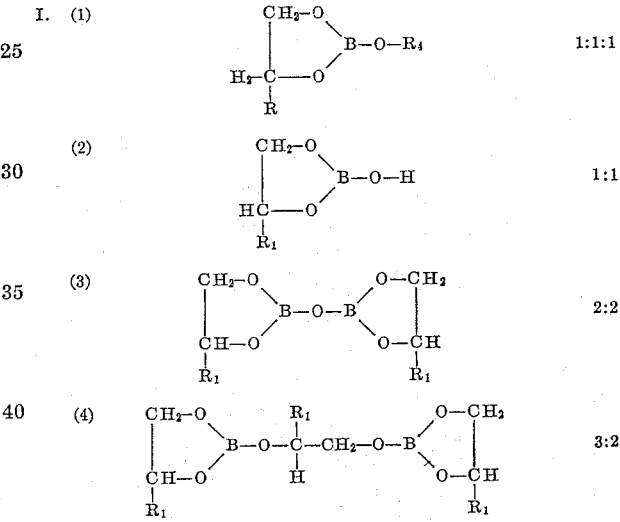

β-Alkylene glycol borates

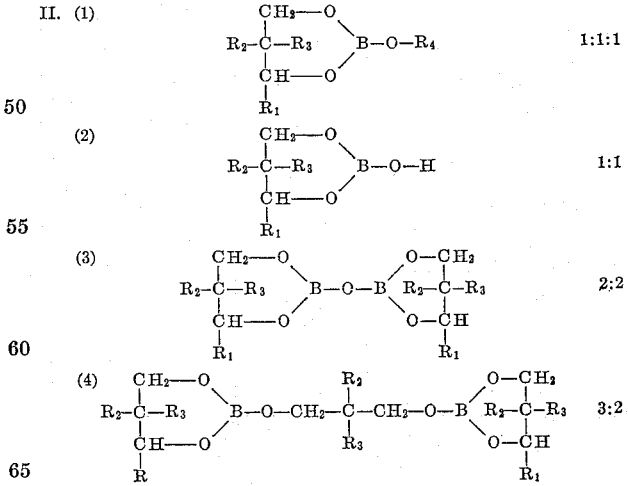

In the above formulae, the R radicals are as defined above.

Mixtures of alkylene glycols can be telomerized by the formation of mixed glycol borates in which $R_1$, $R_2$, $R_3$, and $R_4$ can differ in different parts of the molecule. Such borates will include any of the various combinations of glycols with borate, depending upon the molar ratios of each. Structures of exemplary borates which can be formed from alkylene glycols and telomerized in accordance with the invention will be found in the disclosure of U.S. application for Letters Patent, Serial No. 821,111 filed June 18, 1959, now abandoned.

These alkylene glycol borates are believed to react with the unsaturated hydrocarbons according to the following equation:

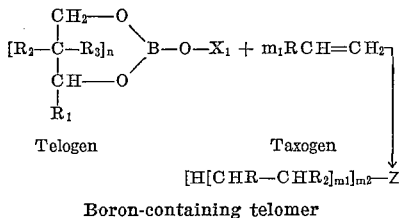

$$[H[CHR-CHR_2]_{m_1}]_{m_2}-Z$$

Boron-containing telomer

In the above formulae, $X_1$ is as defined heretofore or as in Formula B, $m_1$ is the number of moles of compound or unit noted and $m_2$ is the number of chains attached to the terminal group Z which is the α- or β-alkylene glycol borate residue, that is to say, the compound of Formula B less the number of hydrogen atoms ($m_2$) that have been replaced.

R in the formula for the unsaturated hydrocarbon taxogen represents a hydrogen atom or an alkyl, aryl, mixed alkyl aryl, mixed aryl alkyl, or cycloalkyl radical having from one to about sixteen carbon atoms, and preferably not more than eight carbon atoms. These are referred to for convenience hereinafter as α-olefins.

Typical R radicals are phenyl, methyl, ethyl, isobutyl, n-hexyl, n-amyl, n-butyl, n-propyl, isopropyl, cyclohexyl, cyclopentyl, benzyl, methyl phenyl, ethyl phenyl, n-decyl, n-dodecyl, n-tetradecyl, and methyl cyclohexyl.

The taxogen is preferably ethylene, when branching in the polyolefin chain is not desired, such as in the case of alcohols to be used in the preparation of detergents. Mixtures of ethylene and one or more other α-olefins containing a major proportion of ethylene are preferred when branching is desired. The highly branched olefins such as isobutylene do not telomerize as readily under peroxide-initiated free radical conditions and, therefore, although they may be used, are less desirable. α-Olefins higher than ethylene in molecular weight can be used alone, but react more slowly and produce lower conversions and yields than ethylene.

Telomers composed partially or wholly of higher taxogens such as propene, butene-1, pentene-1, 4-methyl pentene-1, 3-methyl hexene-1, hexene-1, heptene-1, octene-1, decene-1, styrene and 8-p-menthene are of lower molecular weight and lower melting point than those obtained using ethylene alone or ethylene-rich mixtures under comparable conditions.

The reaction requires a free radical initiator.

Furthermore, the telomerization reaction chain is easily interrupted and the reaction halted by conventional free radical inhibitors, and the reactants should be relatively free from such inhibitors.

Initiators which may be used include diacyl peroxides such as diacetyl peroxide, dipropionyl peroxide, dibutyryl peroxide, dilauroyl peroxide, acetyl benzoyl peroxide, and dibenzoyl peroxide; dialkyl peroxides such as di-tert-butyl peroxide, dihexyl peroxide, di-isopropyl peroxide, di-isobutyl peroxide, di-2-ethylhexyl peroxide, di-n-butyl peroxide, and diethyl peroxide; diaryl peroxides or diaralkyl peroxides such as dicumyl peroxide, perhalogen compounds, such as hexachloroethane, and combinations thereof with dialkyl peroxides, organometallic compounds such as tetraethyl lead and tetraphenyl lead; and azo-N-N-compounds such as azobis (isobutyronitrile) and diazoaminobenzene.

Di-tert-butyl peroxide and α-dicumyl peroxide are preferred free radical initiators for use in the process of this invention. The stability of free radical initiators is customarily evaluated in terms of half-life at a stated temperature, and the following table compares this for several commercially available free radical initiators:

TABLE I

| Compound | Temp. (° C.) | Half Life (Hours) | No. of Moles of Radical Produced Per Pound |
|---|---|---|---|
| 1. Tetraethyl Lead | | | 5.62 |
| 2. Lauroyl Peroxide | 50 | 54.2 | 2.27 |
| | 70 | 3.4 | |
| | 85 | 0.5 | |
| 3. Dicumyl Peroxide | 115 | 12.4 | 3.34 |
| | 130 | 1.8 | |
| | 145 | 0.38 | |
| 4. Di-t-butyl Peroxide | 100 | 218 | 6.20 |
| | 115 | 34 | |
| | 130 | 6.4 | |
| | 145 | 1.4 | |
| | 160 | 0.24 | |
| 5. Benzoyl Peroxide | 70 | 13.0 | 3.74 |
| | 85 | 2.15 | |
| | 100 | 0.40 | |
| 6. 2,4-dichlorobenzoyl Peroxide | 50 | 17.8 | 2.38 |
| | 70 | 1.41 | |
| | 85 | 0.25 | |
| 7. Azobis (isobutyronitrile) | 80 | 1.26 | 5.50 |

In general, the half-life of the free radical initiator employed should, at the reaction temperature, be within the range of from about 0.01 to about 10 hours, since such initiators have been found to give the best results. By suitable modification of the reaction conditions, however, it is possible to employ free radical initiators whose half-life is outside this range.

The reaction conditions can be widely varied. The preferred reaction temperature is established by the temperature at which the free radical initiator decomposes to give a rapid liberation of a substantial amount of free radicals within the above-stated range for half-life. For di-tertiary-butyl peroxide, for example, as the table shows, the preferred reaction temperatures are within the range of from 125 to 195° C. Lauroyl peroxide, on the other hand, can be used at temperatures of from 65 to 120° C. At reaction temperatures below this, the reaction time tends to be quite long because of the slower evolution of free radicals. Higher temperatures may be wasteful, unless strict incremental addition of the free radical initiator is used, since the free radical initiator may be decomposed at a higher rate than can be utilized in the telomerization, so that the free radicals will be lost and therefore wasted. In general, for heat-decomposable free radical initiators, reaction temperatures within the range of from 40 to 200° C. are useful.

If the boiling point of the unsaturated hydrocarbon is low, as in the case of ethylene and propylene, it is necessary to operate under pressure.

If the free radical initiator is decomposable by radiation, such as by ultraviolet rays, such radiation can be used, and it may then be unnecessary to heat the reaction mixture above room temperature. Azo-bis-(cyclohexane nitrile) and azo-bis-(isobutyronitrile) are initiators of this type, and in fact the latter initiator could be used to effect telomerization at temperatures below 0° C.

If the reactants are liquids at the reaction temperture, no solvent is necessary unless dilution is desired to maintain control of the reaction rate. However, a solvent for the unsaturated hydrocarbons will assist in bringing it into contact with the telogen, and it may be possible by virtue of such facilitation of the reaction to use less olefin in the reaction mixture. A solvent may also be desirable when the telogen is a solid in order to increase the reaction rate.

Any such solvent should be inert under the telomerization reaction conditions. Suitable solvents include benzene, cyclohexane, n-heptane, n-octane and iso-octane. Preferably, the reaction mixture is agitated.

The reaction is exothermic, and requires careful control to prevent the temperature from rising so high that free radical initiator decomposition becomes too rapid.

The reaction time will depend upon the initiator and the reactants, the concentrations thereof, and the reaction temperature. It is usually convenient to employ reaction conditions such that the reaction can be completed in a time as short as one hour. Reaction times as long as fifty hours, however, may not be out of line, depending upon the need.

A high olefin concentration will yield a higher molecular weight product than will a lower olefin concentration. A lower temperature has the same effect. At any given pressure level, the average molecular weight of the product may be increased by operating at the minimum temperature and olefin gas pressure throughout the reaction during the addition of the free radical initiator. In this manner, greater telogen conversions may be obtained together with the production of telomers of a more uniform average molecular weight distribution.

A continuous reaction is of particular interest in a commercial process. This is readily effected by suitable equipment which permits continuous blending of the alkylene glycol borate with the olefin and free radical initiators, holding them in a pressurized reaction chamber in which they have a dwell time equivalent to that required to complete the reaction, and then drawing them off to a working-up chamber where the solvent is removed and the residue recovered.

Telomer products having a wide range of molecular weights which vary according to the reactants' reaction conditions and concentration of reactants are obtainable. The telogen used and the pressure of the taxogen affect the molecular weight of the telomer obtained.

The borate groups are then removed from the telomer by hydrolysis. Several methods are available.

In one procedure, the alkylene glycol borate telomer is hydrolyzed in an aqueous solution or suspension of an inorganic or organic base, such as an alkali or alkaline earth metal oxide, hydroxide, or carbonate, for example, sodium hydroxide, potassium hydroxide, calcium hydroxide, calcium oxide, and barium hydroxide, monoethanolamine and triethanolamine. The rate of hydrolysis can be accelerated by beating the mixture, if desired, and by carrying out the reaction under conditions such that intimate contact with the base is assured. The higher the concentration of base, the more rapid the hydrolysis. From 5 to 40% solutions of sodium and potassium carbonate give a satisfactory rapid hydrolysis even at room temperature. A 5 to 40% suspension of calcium hydroxide also is effective. In addition to water, aqueous alcohol, such as aqueous methanol, and ethanol solutions may be used, as well as the alcohol alone. Hydrolysis is usually very rapid when carried out at a reflux temperature of approximately 100° C. with an excess of base. Saturation of the reaction solution with salt such as sodium chloride minimizes extraction losses of low molecular weight telomer glycol to the aqueous phase, because of the "salting out" effect.

The telomer glycol hydrolysis product is immiscible with the aqueous phase so that the telomer glycol can be separated from the hydrolysis reaction mixture by decantation or solvent extraction. The telomer glycol or solution thereof can be washed as with water or aqueous saturated salt solution to remove excess alkali, and, if an anhydrous product is required, can be further dried by heating in a vacuum or by azeotropic distillation.

A modification of the above hydrolysis procedure is available. In this method the borate telomer is dissolved in an organic solvent immiscible with water, such as benzene or toluene, and the base added with a very small amount of water, after which the mixture is heated and stirred until hydrolysis is complete. If the solvent is one which forms an azeotrope with water, it will assist in removing water from the reaction mixture at the conclusion of the reaction. An appropriate proportion of the base is approximately 10 to 25% by weight of the telomer, and the amount of water can range from 25 to 100% of the weight of the base.

The glycol hydrolysis product is soluble in toluene, and the solvent phase can be separated from the alkaline water phase by decantation and filtration. The toluene or other organic solvents can then be removed by distillation, preferably under vacuum, desirably removing water azeotropically, to recover a relatively dry glycol. This method is not usually effective to remove all of the boron, in contrast to the first-described procedure, but the hydrolysis usually proceeds sufficiently far to make the procedure useful for most commercial purposes, recycling unhydrolyzed telomer for further treatment.

It is also possible to deborate the telomer by heating the telomer with a polyhydric alcohol such as glycerol or mannitol. In this procedure, transesterification takes place, the boric acid forming an ester with the polyhydric alcohol in order to drive the transesterification to completion; however, this polyhydric alcohol may be difficult to remove from the telomer glycol.

In general, the dehydration only of the secondary or tertiary alcohol group can be effected at the branched chain telomeric group by heating under controlled conditions, below temperatures at which dehydration of the primary hydroxyl group would be obtained. The temperatures also must be kept low enough so that isomerization does not take place. In most cases, temperatures above about 150° C. and up to about 300° C. are satisfactory.

Dehydration can be effected at a somewhat lower temperature, particularly in the case of the low molecular weight alcohols, by refluxing or heating to from about 100 to about 225° C., using a mild dehydrating agent such as sodium sulfate, alumina, bauxite, clay, phosphoric acid, and other complex catalysts.

In view of the presence of a branched chain or additional alkyl group at the carbon bearing the secondary or tertiary hydroxy, a mixture of dehydration products may be obtained, depending upon whether the double bond is introduced into the branched chain group or into the straight chain of the alcohol. Thus, for example, 3-methyl-3-pentane-1-ol can be hedydrated to form a mixture of 3-methyl-3-pentane-1-ol and 3-methylene-1-pentane-ol.

When a dehydrating agent is employed, the glycol may be passed over or through a column of the dehydrating agent, maintained at the appropriate dehydration temperature, i.e., at a temperature within the range from about 100 to about 300° C.

Dehydration can also be accomplished by refluxing or distilling the alcohol in the presence of an acid catalyst, such as sulfuric or phosphoric acid, or an organic acid such as an alkane sulfonic acid or a perfluorinated carboxylic acid such as trifluoroacetic acid. When a dehydrating agent is employed, an amount within the range from about 0.01 to about 0.1% is ordinarily sufficient.

The dehydration can be assisted by refluxing the glycol in the presence of a readily distillable inert liquid which forms an azeotropic mixture with water, such as cyclohexane, dioxane, isopropyl ether, and the like. The aqueous azeotrope of the entraining liquid should boil below the boiling point of the unsaturated primary alcohol, so that the water will be removed as it is formed together with the entraining liquid. Aromatic hydrocarbons such as benzene or toluene are in general not satisfactory as entraining agents, because of the possibility of olefinic alkylation of the aromatic compound during the dehydration step.

As the final step of the process, the unsaturated alcohol obtained as a product of the dehydration is hydrogenated to the corresponding saturated alcohol. The hydrogenation step is accomplished in accordance with any known procedure, such as, for example, hydrogenation with a hydrogenation catalyst, such as Raney cobalt, Raney nickel, platinum, platinum oxide, palladium, copper chromite, copper chromium oxide, and like catalysts, desirably in the presence of a solvent, such as methanol or ethanol. Platinum oxide can be used under 1 to 3 atmospheres of hydrogen at from 15 to 50° C. Raney nickel can be used under 1 to 20 atmospheres of hydrogen at from 20 to 150° C.

In some cases, direct hydrogenolysis or pyrolysis and hydrogenolysis of the telomeric borate to the final saturated primary alcohol can be effected. In this procedure, the telomeric borate is converted directly to the primary alcohol by reaction with hydrogen in the presence of a hydrogenolysis catalyst, such as copper chromite, copper chromium oxide, and copper chromium oxide, employing normal hydrogenolysis conditions, such as hydrogen pressures of 500 to 3000 p.s.i. at temperatures of from 175 to 300° C.

The telomeric primary alcohols obtained by this procedure have molecular weights ranging from as low as 118 to considerably beyond 30,000, depending upon the telomerization conditions, particularly the pressure of the taxogen. The low molecular weight materials i.e. those having average cryoscopic molecular weights from about 118 to about 1,800, are viscous oils or soft solids. The medium molecular weight materials, having solution viscosity molecular weights of from about 1,800 to about 12,000, are waxes, the hardness, flexibility and toughness of which increase with molecular weight. The high molecular weight materials, having solution viscosity molecular weights in excess of 12,000, are tough plastic resins.

The following examples in the opinion of the inventor represent preferred embodiments of their invention.

Example 1

407 grams of 1,3-butylene glycol borate and 19.5 grams of ditertiary butyl peroxide were added to a water-cooled electrically stirred Parr autoclave of approximately 1 liter capacity. The bomb was flushed with nitrogen, after which ethylene was added to obtain a pressure of 560–600 p.s.i. The temperature was raised to 370–375° F., and both pressure and temperature were maintained within these ranges for 5 hours. After cooling and reducing to atmospheric pressure, volatile material was stripped off. The residue was found to consist of telomeric alkylene glycol borate. About 300 parts of the telomer was mixed into 600 parts of water containing 105% of the calculated amount of sodium hydroxide necessary to react with all the boron present to produce sodium orthoborate. Granulated sodium chloride was then added, with stirring, until a saturated solution was obtained. The salt solution is completely miscible with the unconverted 1,3-butylene glycol present, but limits the aqueous miscibility of the low molecular weight telomer fractions present, especially of the 1:1 ethylene telomer fraction, consisting of 3-methylpentane-1,3-diol, which is quite soluble in distilled water. The upper less dense organic phase was then separated in the usual manner from the lower more dense aqueous phase. The separated organic telomeric glycol layer was then shaken with about one-half its volume of 5% aqueous sodium hydroxide solution, previously saturated with sodium chloride in order to ensure complete deboration. The upper less dense organic phase was again allowed to collect over the lower more dense aqueous phase, and then very sharply separated. The separated organic telomeric glycol layer, completely free of boron and containing only a trace of sodium hydroxide, was shaken with and sharply separated from two portions of about one-half its volume each of warm saturated aqueous sodium chloride solution. The resulting glycol fraction was nearly free of sodium hydroxide, but contained appreciable amounts of entrained water, which was cautiously stripped off.

The deborated isolated telomeric glycol weighed 274 grams, and was found to have an average molecular weight of 216. 9.15 moles of glycol had been produced per mole of initiator, and a 33.3% conversion of glycol to telomer had been obtained. 31% of the product was the low boiling 3-methylpentene-1,3-diol, 48.2% was glycol intermediate in molecular weight and 24.4% was heavy waxy bottoms boiling above 215° C. at 0.7 mm.

The product was dehydrated in accordance with the procedure described in U.S. Patent No. 2,671,121. 10 parts of the glycol were refluxed with 0.1 part of sulfuric acid in the presence of an equal volume of cyclohexane. Water was removed as the reaction proceeded. The final product obtained was a mixture composed principally of 2-ene-1-ol alcohol. This olefin was then hydrogenated in methanol solution over a platinum oxide catalyst, at a pressure ranging from 1 to 3 atmospheres at a temperature of from 25 to 30° C. to produce the corresponding primary saturated alcohol.

Examples 2 to 14

A series of semi-continuous telomerizations of ethylene with 2:2 1,3-butylene glycol borate (BGB in the table) were run. The telomerizations were carried out in a water-cooled electrically heated stirred Parr autoclave of approximately 1 liter capacity. About one-third of the amount of telogen given in the table below was placed in the bomb, preparatory to the heat-up to reaction temperature, under ethylene pressure. The peroxide initiator, di-tertiary-butyl peroxide, was dissolved in the borate, and this mixture then fed incrementally over the period of feed time into the bomb, which was maintained at the reaction temperature and pressure given.

TABLE II

| Example Number | Telogen | Telogen (g.) | Benzene (g.) | DTBP (g.) | Reaction Conditions | | Feed Time (Hrs.) | Total Time (Hrs.) | Total Isolated Glycols (g.) |
|---|---|---|---|---|---|---|---|---|---|
| | | | | | Pressure (p.s.i.g.) | Temp., °F. | | | |
| 2 | BGB | 407 | None | 19.5 | 560–600 | 370–5 | 3.75 | 4.75 | 322 |
| 3 | BGB | 407 | None | 19.5 | 560–600 | 370–5 | 5.0 | 6.0 | 274 |
| 4 | BGB | 407 | None | 39.0 | 560–600 | 370–5 | 4.3 | 5.3 | 427 |
| 5 | BGB | 407 | None | 39.0 | 580–600 | 375 | 3.0 | 4.0 | 473 |
| 6 | BGB | 187 | 145 | 17.2 | 550–575 | 300–330 | 5.2 | 6.2 | 116 |
| 7 | BGB | 185 | 144 | 17.1 | 560–590 | 300–330 | 4.8 | 5.8 | 297 |
| 8 | BGB | 180 | 140 | 16.5 | 560–590 | 300–330 | 4.4 | 4.4 | 161 |
| 9 | BGB | 778 | ¹1,210 | 25.8 | 500–600 | 285–311 | 6.25 | 7.0 | 277 |
| 10 | BGB | 709 | ¹1,101 | 23.5 | 500–590 | 290–311 | 5.1 | 6.1 | 330 |
| 11 | BGB | 167 | 129 | 23.1 | 500–590 | 290–311 | 5.5 | 5.5 | 181 |
| 12 | BGB | 160 | 124 | 22.1 | 500–585 | 290–311 | 5.5 | 6.7 | 181 |
| 13 | BGB | 168 | 130 | 15.5 | 500–585 | 290–311 | 4.5 | 5.5 | 145 |
| 14 | BGB | 169 | 131 | 15.6 | 500–580 | 290–311 | 4.7 | 5.7 | 143 |

See footnote at end of table.

TABLE II—Continued

| Example Number | Average Molecular Weight Isolated Glycols | Moles Prod. Mole DTBP | Percent Conversion Glycol to Telomer | Isolated Product | | |
|---|---|---|---|---|---|---|
| | | | | Percent 3-methyl-pentane-1,3-diol | Percent "Middles" [2] | Percent "Bottoms" [3] |
| 2 | 221 | 10.9 | 38.3 | 30 | 45.2 | 24.8 |
| 3 | 216 | 9.5 | 33.3 | 31.7 | 48.2 | 20.1 |
| 4 | 229 | 7.0 | 49.1 | 29.1 | 46.5 | 24.4 |
| 5 | 252 | 7.0 | 49.4 | 25.6 | 49.0 | 25.4 |
| 6 | 264 | 3.8 | 25.1 | 21.5 | 47.2 | 31.3 |
| 7 | 297 | 4.9 | 33.1 | 16.4 | 39.4 | 44.2 |
| 8 | 271 | 5.2 | 35.3 | 15.1 | 42.0 | 42.9 |
| 9 | 270 | 5.8 | 14.1 | 11.1 | 50.0 | 38.9 |
| 10 | 234 | 8.8 | 21.4 | 8.8 | 33.4 | 57.8 |
| 11 | 276 | 4.1 | 42.1 | 9.9 | 41.0 | 49.1 |
| 12 | 270 | 4.4 | 45.1 | 11.1 | 35.9 | 53.0 |
| 13 | 233 | 5.8 | 39.7 | | | |
| 14 | 296 | 4.5 | 30.7 | 10.9 | 40.3 | 48.8 |

[1] Data is for continuous type run where product was regularly removed as well as where the reactants were fed continuously in increments.
[2] "Middles" B.P. 112° C./0.7 mm.–215° C./0.7 mm.
[3] "Bottoms" B.P. above 215° C./0.7 mm.

Each of the reaction mixtures obtained after separation of the alkylene borate telomer was deborated by hydrolysis with a 5% excess of sodium hydroxide in saturated aqueous sodium chloride, followed by washing with saturated aqueous sodium chloride until alkali free, thereby producing the hydrolyzed telomer glycol. This was then dehydrated in accordance with the procedure of Example 1, and hydrogenated over Raney nickel in ethanol at a hydrogen pressure ranging from 20 to 5 atmospheres at 100° C. to produce the primary alcohol mixture.

*Example 15*

The composite crude 3-methyl-pentanediol-1,3 from the low pressure telomerization by ethylene of bis-(butanediol-1,3) diborate in accordance with Examples 2 to 14 was rectified by vacuum fractionation through a 20 to 250 mm. Vigreux column, the fraction boiling over the range from 113 to 118° C. at 10 mm. being taken as the pure material, density at 23° C. 0.974 g./ml., refractive index at that temperature, 1.4527. 80 grams of the 3-methyl-pentanediol-1,3 was dropped onto 16 g. of powdered sodium sulphate, externally heated at 250+10° C. over a period of one hour, provision being made for condensing the product by means of a condenser set downwardly for distillation. Vacuum fractionation of the product produced 28 grams of mixed alkanols boiling over the range of 38 to 48° C. at 10 mm., 42 grams of unreacted 3-methyl-pentanediol-1,3 and 3 grams of low boiling olefinic materials. This corresponds to a perpass conversion of 41% to the mixed alkenols, density at 24° C., 0.869 g./ml., refractive index at the same temperature, 1.4487.

This product was hydrogenated to a telomeric alcohol. 20 grams of the 3-alkyl-3-alkene-1-ols, 125 ml. of methanol, and 0.4 gram of platinum oxide catalyst were placed in a clean 1000 ml. capacity Parr pressure bomb, provided with stirring means. The bomb contents were flushed with nitrogen to expel air, and then pressured up with 120 p.s.i.g. of hydrogen gas at 20 to 25° C. The reduction was allowed to proceed for two hours to a final constant pressure of hydrogen of 38 p.s.i.g., most of the hydrogen being absorbed during the first half hour.

The product was filtered to remove the used catalyst, and then fractionally distilled through a 20 by 250 ml. packed Vigreux column. A yield of 16.1 g. of 3-methyl pentanol-1 was obtained, boiling point 148 to 153° C. Refractive index at 25° C. 1.4182, density at the same temperature, 0.821 g./ml.

The telomer-derived saturated primary alcohols of the invention, as the general formula shows, possess a hydrocarbon group derived from the olefin and a terminal primary alcohol group. As a result, they have most attractive properties, both chemical and physical.

The hydrocarbon group of the telomer-derived alcohol, according to its molecular weight and the nature of the olefin used, controls the melting point of the telomer-derived alcohol, which varies from a liquid through a wax to a synthetic resin. The alcohol group imparts reactivity with isocyanates, polyisocyanates, inorganic and organic acids, acid halides, acid anhydrides and like ingredients, to form urethanes and esters. Of particular interest are the surface-active reaction products of the ethylene-derived primary alcohols having an anionic, nonionic or cationic surface active group attached to the alcohol group, such as a sulfate, ester-linked sulfonate, alkylene-amine, alkylenoxy or polyalkyleneoxy group, such as an ethenoxy or polyethenoxy group, and combinations of the latter with any of the first-mentioned anionic or cationic groups.

These surface-active agents, having a long straight chain, are more readily destroyed by naturally occurring sewage bacteria than the highly branched structures typical of many synthetic detergents. Unless destroyed, detergents cause excessive foaming in sewage disposal plants during sewage processing. The telomer alcohol detergents of the invention are therefore useful in alleviating this problem.

The telomer alcohols of the invention can, for example, be employed in the preparation of long chain alkyl sulfuric acid esters. Any of the various recognized processes for the manufacture of such sulfated alcohols can be employed, for example, sulfation with 99% sulfuric acid, or with chlorosulfonic acid $ClSO_3H$ as described by D. D. Whyte, Journal of the American Oil Chemists Society, 32 313–16 (1955), and British Patent No. 680,629. The alcohols can also be sulfated by heating them with a slight molecular excess of sulfamic acid at temperatures of about 140° C., the product being the ammonium salt of the sulfuric acid ester, $ROSO_3NH_4$, wherein R represents the telomer alcohol radical. Amides such as dicyandiamide and amines such as morpholine are effective catalysts in this reaction. Sulphur trioxide dissolved in liquid sulphur dioxide is also an effective reagent for the sulfation of these telomer alcohols.

The alcohols of the invention can also be employed in preparation of ester-linked sulfonates in which the telomer alcohol is employed to esterify an acid bearing a sulfonic acid group, for example, sulfonates of the type $ROOCCH_2SO_3H$, in which the R is derived from the telomer alcohol. An important member of this type of detergent sulfonates are the dialkyl sulphosuccinates, such as, for example, the di-telomer alcohol sulphosuccinates. These compounds can be prepared by esterification of the telomer alcohol with sulphosuccinic acid. Only one of the alkyl groups can be derived from the telomer alcohol; the other can be a long or short chain alcohol, such as 2-ethylhexyl alcohol analogous to Aerosol OT, di-2-ethylhexyl-sulphosuccinate. These compounds can also be prepared by esterifying maleic acid with the telomer alcohol, and then adding sodium bisulphite NaHSO$_3$ across the double bond.

The telomer alcohols can be employed in the esterification of phophoric acids to produce organic phosphates, such as, for example, the di-telomer alkyl orthophosphate and the mono-telomer alkyl orthphosphate, as well as the alkyl esters of polyphosphoric acids having the formula Na$_5$R$_5$(P$_3$O$_{10}$)$_2$, where the R corresponds to the telomer alcohol.

Long chain nitriles useful in the preparation of cationic surfactants are obtainable by reacting the telomer alcohols with acrylonitrile, forming a nitrile of the type ROCH$_2$CH$_2$CN, where R represents the telomer group. These compounds can be hydrogenated to the resulting aminopropyl alkyl ethers, and these readily add ethylene oxide to form polyoxyethylene derivatives. The amines can also be reacted with fatty acids to form amides of the type RCONHCH$_2$CH$_2$OR$_1$, where R is the radical of the fatty acid and R$_1$ the telomer alcohol group.

The telomer alcohols also are readily reacted directly with ethylene oxide to produce polyethylene oxide detergents. It is possible to build chains of any desired number of ethenoxy units, as desired, and the properties of the product depend to a considerable extent on the number of ethenoxy units. The longer the ethenoxy chain, the greater the solubility of the surfactant in water, and the greater the surfactant properties. Those having he smaller number of ethenoxy groups have good wetting and emulsifying properties. The resulting products are of the type RO(CH$_2$CH$_2$O)$_n$H, where $n$ represents the number of ethenoxy groups and R the telomer alcohol group. The reaction is normally carried out by treating the telomer alcohol with ethylene oxide in the presence of a small amount of catalyst, and the general procedure is described in Industrial & Engineering Chemistry, 46 1930–4 (1954). Propylene oxide can also be used, either alone or in admixture with ethylene oxide, but the propylene oxide condensation products generally have a lower water solubility than the ethylene oxide condensation products.

The polyoxyethylene detergents can also be reacted with sulfuric acid or chlorosulfonic acid to produce the corresponding sulfated detergents, which have the additional advantage of containing a plurality of ethenoxy groups. The resulting detergents are, of course, anionic detergents, as compared to the nonionic ethenoxy derivatives, but combined the valuable properties of both these types because of the content of ethenoxy groups.

All of the above products are exemplary of telomeric surfactants which can be prepared in accordance with the invention. These surfactants can be formulated with conventional detergent composition ingredients to form compositions having a variety of useful properties. Detergent compositions will usually contain from 10 to 35% of the surfactant, from 10 to 45% of an inorganic builder, usually a polyphosphate, such as an alkali metal pyrophosphate, tripolyphosphate or polymetaphosphate, from 0 to 25% of an alkali metal silicate, and small amounts, up to about 15%, of filler salts such as sodium sulfate, whose presence usually arises from the neutralization of acids employed in the preparation of the surfactant itself. Soil suspending agents which assist in preventing redeposition of soil suspended by the detergent solution can be added in a small amount, usually up to about 5%. Such agents include sodium carboxymethyl cellulose, ethyl hydroxyethyl cellulose, hydroxyethyl cellulose and sodium cellulose sulfate. Agents which assist the development and retention of the foaming power of this solution so as to more closely approximate that of a soap solution can also be added, in amounts ranging up to about 10%. Such agents include the fatty monoalkanolamides, such as lauryl ethanolamide, the monoethanolamides derived from fatty acids, and lauryl isopropanolamide.

These detergent compositions can be formulated in any desired form, such as liquids, powders, flakes, bars, cakes and spray-dried particles. All such forms and the methods of their preparation are well known in the detergent art, and further description here is not required.

The following is an Example of the preparation of sodium telomer sulphate.

*Example 16*

Into a 1000 ml. three-neck reaction flask fitted with a mechanical stirrer and provided with an ice bath for external cooling was placed 90 grams of glacial acetic acid. With stirring and external cooling, 30 ml. (53.6 grams) of chlorosulphonic acid was cautiously added. The mixture was maintained at 0 to 5° C., with stirring, while 87.7 grams of the dry telomer alcohol prepared in accordance with Example 3, water-extracted to remove C$_6$ and C$_8$ low telomers, and having an average molecular weight of 250, was added, in small portions, over a period of 10 minutes. The reaction mixture then was stirred for an additional 30 minutes at 4° C. The resulting mass was poured onto a mixture of 300 grams of cracked ice and 300 ml. n-butanol to reduce foaming. The solution was neutralized with sodium carbonate and the n-butanol solution of sodium telomer alcohol sulphate separated from the aqueous layer. The aqueous layer was extracted 4 times with n-butanol. The combined n-butanol extracts were concentrated in vacuo to remove all the water and alcohol. The resulting pasty residue had excellent detergent properties, exhibited good foaming action, and readily emulsified water and light hydrocarbons such as xylene. An emulsion of 5 ml. of xylene in 15 ml. of water containing about 3 grams of sodium telomer sulphate was found to be stable to 15 minutes of centrifuging at 2000 r.p.m.

Esters obtained by reaction of the primary aliphatic alcohols of the invention with phosphoric acid, phthalic acid, sebacic acid and like organic acids also possess specific and desirable properties not found in the branched or ring structures, and are highly useful as plasticizers for synthetic resins.

In addition to their use as chemical reactants in the preparation of esters, the high molecular weight telomer primary aliphatic alcohols of the invention are useful in wax formulations, in coating applications, and as textile lubricants. The liquid and oily telomers are useful as lubricants for textiles, machinery and internal combustion and jet engines, as lubricant additives, and as hydraulic fluids. The waxy telomers are useful as waxes in the formulation of polishes, candles, carbon paper, crayons, matches and printing inks. The resinous materials are thermoplastic and can be used in coating compositions, hot melts, rubber compounding and wire cable and pipe covering. Both waxes and resins can be blended with polyethylene and/or paraffin wax, and the blends can be used in coating compositions for paper and paper containers, for example, milk cartons.

I claim:

1. A process for producing olefin telomer primary aliphatic alcohols from alkylene glycols, which comprises forming an alkylene glycol borate from an alkylene glycol having from about three to about thirty carbon atoms in the molecule and having a primary hydroxyl group, telomerizing an α-olefin taxogen having from about two to about twelve carbon atoms in the molecule with the alkylene glycol borate in the presence of a free radical initiator capable of initiating the telomerization at a temperature at which an evolution of free radicals from the initiator is obtained, deborating the resulting boron-containing olefin telomer to produce the corresponding glycol, dehydrating the glycol at a temperature within the range from about 150 to about 300° C. which is below the temperature of dehydration of the primary hydroxyl group, and below the temperature of isomerization to remove the hydroxyl group at the branched chain telomeric group and produce an alkenol and hydrogenating the alkenol to produce a primary saturated aliphatic alcohol.

2. A process in accordance with claim 1 in which the telomerization temperature is within the range from 40 to 200° C.

3. A process in accordance with claim 1 in which the α-olefin is ethylene.

4. A process in accordance with claim 1 in which the free radical initiator is a dialkyl peroxide.

5. A process in accordance with claim 1 in which the telogen is an α-alkylene glycol borate.

6. A process in accordance with claim 1 in which the telogen is a β-alkylene glycol borate.

7. A process in accordance with claim 1 in which the deboration is carried out using an aqueous alkaline solution.

References Cited by the Examiner

UNITED STATES PATENTS

| | | | |
|---|---|---|---|
| 2,160,058 | 5/1939 | Covert | 260—583 |
| 2,350,350 | 6/1944 | Gresham | 260—615 |
| 2,423,497 | 7/1947 | Harmon | 260—618 |
| 2,452,602 | 11/1948 | Robinson | 260—583 |
| 2,633,473 | 3/1953 | Bruner | 260—459 |
| 2,654,772 | 10/1953 | Pavlic | 260—459 |
| 2,668,181 | 2/1954 | Banes et al. | 260—642 |
| 2,670,386 | 2/1954 | Erchak et al. | 260—642 |
| 2,671,116 | 3/1954 | Kosmin | 260—615 |
| 2,671,121 | 3/1954 | Banes et al. | 260—462 |
| 2,721,181 | 10/1955 | Lawrence et al. | 260—639 X |
| 2,741,548 | 4/1956 | Darling et al. | 260—462 |
| 3,208,416 | 3/1962 | Lynn et al. | 260—481 |
| 3,033,896 | 5/1962 | Anderson | 260—481 |
| 3,092,586 | 6/1963 | Dykstra | 260—642 |
| 3,117,153 | 1/1964 | Aldridge et al. | 260—642 |

FOREIGN PATENTS 680,629  10/1952  Great Britain.

OTHER REFERENCES

Steinberg et al., Ind. & Eng. Chem., vol. 49 (1957), pp. 174–181.

Roberts et al., "J. Am. Chem. Soc," vol. 67, p. 148 (1945).

Wagner et al., Synthetic Organic Chemistry (1953) p. 158.

LEON ZITVER, *Primary Examiner*.

CHARLES B. PARKER, *Examiner*.

S. H. LIEBERSTEIN, M. B. ROBERTO, J. E. EVANS, *Assistant Examiners*.